(12) United States Patent
Iljima

(10) Patent No.: US 8,139,042 B2
(45) Date of Patent: Mar. 20, 2012

(54) INPUT DEVICE AND DISPLAY DEVICE WITH INPUT FUNCTION

(75) Inventor: Chiyoaki Iljima, Ina (JP)

(73) Assignee: Sony Corporation, Tokyo (JP)

( * ) Notice: Subject to any disclaimer, the term of this patent is extended or adjusted under 35 U.S.C. 154(b) by 399 days.

(21) Appl. No.: 12/546,978

(22) Filed: Aug. 25, 2009

(65) Prior Publication Data

US 2010/0073313 A1    Mar. 25, 2010

(30) Foreign Application Priority Data

Sep. 25, 2008    (JP) ................................. 2008-245390

(51) Int. Cl.
*G06F 3/041* (2006.01)
(52) U.S. Cl. ........... 345/173; 349/117; 349/115; 349/96
(58) Field of Classification Search .................. 345/173; 349/117, 96, 115
See application file for complete search history.

(56) References Cited

U.S. PATENT DOCUMENTS

| | | | |
|---|---|---|---|
| 6,020,945 A | 2/2000 | Sawai et al. | |
| 6,738,117 B2 * | 5/2004 | Minakuchi | 349/118 |
| 6,822,711 B1 * | 11/2004 | Yoshida et al. | 349/115 |
| 7,060,333 B2 * | 6/2006 | Takeuchi et al. | 428/1.3 |
| 7,462,306 B2 * | 12/2008 | Fukagawa | 264/1.34 |
| 8,017,199 B2 * | 9/2011 | Fukagawa et al. | 428/1.1 |
| 2004/0125292 A1 * | 7/2004 | Maeda | 349/117 |
| 2005/0190328 A1 * | 9/2005 | Sekime | 349/119 |
| 2009/0027599 A1 * | 1/2009 | Ohgaru et al. | 349/96 |
| 2009/0122237 A1 * | 5/2009 | Fukagawa et al. | 349/96 |
| 2010/0026936 A1 * | 2/2010 | Uesaka et al. | 349/75 |

FOREIGN PATENT DOCUMENTS

| | | |
|---|---|---|
| JP | 10-048625 | 2/1998 |
| JP | 3854392 | 9/2006 |

* cited by examiner

*Primary Examiner* — Van Chow
(74) *Attorney, Agent, or Firm* — K&L Gates LLP

(57) ABSTRACT

An input device which includes a light-transmissive touch panel, a phase difference plate disposed on the opposite side to an input operation surface of the touch panel, a ¼ wavelength plate disposed on the side of the input operation surface of the touch panel, and a polarizing plate on the touch panel side, which is disposed on the ¼ wavelength plate toward the input operation surface of the touch panel, wherein a ratio R1 (450 nm)/R1 (590 nm) of the phase difference value R1 (450 nm) for the phase difference plate at a wavelength of 450 nm to the phase difference value R1 (590 nm) for the phase difference plate at a wavelength of 590 nm is greater than a ratio R0 (450 nm)/R0 (590 nm) of the phase differences value R0 (450 nm) for the ¼ wavelength plate at a wavelength of 450 nm to the phase difference value R0 (590 nm) for the ¼ wavelength plate at a wavelength of 590 nm, the phase difference value R1 (590 nm) for the phase difference plate at a wavelength of 590 nm is smaller than the phase difference value R0 (590 nm) for the ¼ wavelength plate at a wavelength of 590 nm, and an absolute value of an angle between the retardation axis of the phase difference plate and the retardation axis of the ¼ wavelength plate is in the range of 60° to 85°.

7 Claims, 11 Drawing Sheets

FIG. 3A

| | | | EMBODIMENTS | | | | | | | |
|---|---|---|---|---|---|---|---|---|---|---|
| ELEMENTS | SIGN | UNIT | EXAMPLE 1 | EXAMPLE 2 | EXAMPLE 3 | EXAMPLE 4 | EXAMPLE 5 | COMPARATIVE EXAMPLE | COMPARATIVE EXAMPLE 1 | COMPARATIVE EXAMPLE 2 | CONDITION |
| POLARIZING PLATE | θp0 | ° | 5 | 10 | 20 | 30 | 150 | 150 | 150 | |
| 1/4 WAVELENGTH PLATE | θr0 | ° | 50 | 55 | 65 | 75 | 15 | 15 | 15 | |
| | R0 (450 nm) | nm | 144 | 144 | 144 | 144 | 144 | 144 | 144 | |
| | R0 (590 nm) | nm | 140 | 140 | 140 | 140 | 140 | 140 | 140 | |
| | R0 (450 nm)/R0 (590 nm) | — | 1.030 | 1.030 | 1.030 | 1.030 | 1.030 | 1.030 | 1.030 | |
| PHASE DIFFERENCE PLATE | θr1 | ° | 135 | 135 | 135 | 135 | 135 | 135 | 135 | |
| | R1 (450 nm) | nm | 147 | 142 | 137 | 120 | 120 | 144 | 113 | |
| | R1 (590 nm) | nm | 135 | 130 | 125 | 110 | 110 | 140 | 110 | |
| | R1 (450 nm)/R1 (590 nm) | — | 1.092 | 1.092 | 1.092 | 1.092 | 1.092 | 1.030 | 1.030 | |
| UPPER POLARIZING PLATE | θp1 | ° | 0 | 0 | 0 | 0 | 0 | 0 | 0 | |
| RELATION BETWEEN POLARIZING PLATE AND UPPER POLARIZING PLATE | θp1−θp0 | | −5 | −10 | −20 | −30 | 30 | 30 | 30 | f |
| RELATIVE RELATION BETWEEN 1/4 WAVELENGTH PLATE AND PHASE DIFFERENCE PLATE | R1 (590 nm)−R0 (590 nm) | nm | −5 | −10 | −15 | −30 | −30 | 0 | −30 | b |
| | R1 (450 nm)/R1 (590 nm)− R0 (450 nm)/R0 (590 nm) | | 0.062 | 0.062 | 0.062 | 0.062 | 0.062 | 0.000 | 0.000 | a |
| | θr1−θr0 | ° | 85 | 80 | 70 | 60 | −60 | −60 | −60 | c |
| RELATIVE RELATION BETWEEN 1/4 WAVELENGTH PLATE AND POLARIZING PLATE | θr0−θp0 | — | 1 | 1 | 1 | 1 | 1 | 1 | 1 | g |
| | | ° | 45 | 45 | 45 | 45 | 45 | 45 | 45 | d |
| RELATIVE RELATION BETWEEN PHASE DIFFERENCE PLATE AND UPPER POLARIZING PLATE | θr1−θp1 | ° | −45 | −45 | −45 | −45 | −45 | −45 | −45 | e |

FIG. 3B

| ELEMENTS | SIGN | UNIT | EXAMPLE 1 | EXAMPLE 2 | EXAMPLE 3 | EXAMPLE 4 | EXAMPLE 5 | COMPARATIVE EXAMPLE 1 | COMPARATIVE EXAMPLE 2 |
|---|---|---|---|---|---|---|---|---|---|
| | | | | | EMBODIMENTS | | | | |
| BRIGHTNESS | | | ◎ | ◎ | ◎ | ○ | ○ | ◎ | × |
| COLORING IN FRONT SURFACE | | | ◎ (NO) | ◎ (NO) | ◎ (NO) | ○ (SLIGHTLY YELLOW) | ○ (SLIGHTLY YELLOW) | × (CONSIDERABLY YELLOW) | △ (YELLOW) |
| VISUAL QUALITY OF IMAGE AT LOW ANGLE | | | NO COLORING | NO COLORING | SLIGHTLY YELLOW AT ANGLE OF DIRECTION | SLIGHTLY YELLOW AT ANGLE OF DIRECTION | SLIGHTLY YELLOW AT ANGLE OF DIRECTION | CONSIDERABLY YELLOW AT ANGLE OF DIRECTION | YELLOW AT ANGLE OF DIRECTION |
| ADVANTAGE OF REFLECTION PREVENTION | | | ◎ | ◎ | ◎ | ◎ | ◎ | ◎ | ◎ |

RESULT

FIG. 4A

| ELEMENTS | | SIGN | UNIT | EMBODIMENTS | | | | | | | | | | CONDITION |
|---|---|---|---|---|---|---|---|---|---|---|---|---|---|---|
| | | | | EXAMPLE 6 | EXAMPLE 7 | EXAMPLE 8 | EXAMPLE 9 | EXAMPLE 10 | EXAMPLE 11 | EXAMPLE 12 | EXAMPLE 13 | EXAMPLE 14 | | |
| POLARIZING PLATE | | Θp0 | ° | 10 | 10 | 10 | 15 | 5 | 25 | 170 | 160 | 180 | |
| 1/4 WAVELENGTH PLATE | | Θr0 | ° | 55 | 55 | 55 | 60 | 50 | 70 | 125 | 125 | 125 | |
| | | R0 (450 nm) | nm | 119 | 119 | 119 | 119 | 119 | 119 | 119 | 119 | 119 | |
| | | R0 (590 nm) | nm | 140 | 140 | 140 | 140 | 140 | 140 | 140 | 140 | 140 | |
| | | R0 (450 nm)/R0 (590 nm) | — | 0.850 | 0.850 | 0.850 | 0.850 | 0.850 | 0.850 | 0.850 | 0.850 | 0.850 | |
| PHASE DIFFERENCE PLATE | | Θr1 | ° | 135 | 135 | 135 | 135 | 125 | 145 | 45 | 45 | 45 | |
| | | R1 (450 nm) | nm | 129 | 139 | 93 | 108 | 108 | 108 | 129 | 129 | 129 | |
| | | R1 (590 nm) | nm | 125 | 135 | 90 | 105 | 105 | 105 | 125 | 125 | 125 | |
| | | R1 (450 nm)/R1 (590 nm) | — | 1.030 | 1.030 | 1.030 | 1.030 | 1.030 | 1.030 | 1.030 | 1.030 | 1.030 | |
| UPPER POLARIZING PLATE | | Θp1 | ° | 0 | 0 | 0 | 0 | 0 | 0 | 0 | 0 | 0 | |
| RELATION BETWEEN POLARIZING PLATE AND UPPER POLARIZING PLATE | | Θp1−Θp0 | | −10 | −10 | −10 | −15 | −5 | −25 | 10 | 20 | 0 | f |
| RELATIVE RELATION BETWEEN 1/4 WAVELENGTH PLATE AND POLARIZING PLATE | | R1 (590 nm)−R0 (590 nm) | nm | −15 | −5 | −50 | −35 | −35 | −35 | −15 | −15 | −15 | b |
| | | R1 (450 nm)/R1 (590 nm)−R0 (450 nm)/R0 (590 nm) | | 0.180 | 0.180 | 0.180 | 0.180 | 0.180 | 0.180 | 0.180 | 0.180 | 0.180 | a |
| | | Θr1−Θr0 | ° | 80 | 80 | 80 | 75 | 75 | 75 | −80 | −80 | −80 | c |
| | | R1 (450 nm)/R1 (450 nm) | — | 1 | 1 | 1 | 1 | 1 | 1 | 1 | 1 | 1 | g |
| RELATIVE RELATION BETWEEN 1/4 WAVELENGTH PLATE AND POLARIZING PLATE | | Θr0−Θp0 | ° | 45 | 45 | 45 | 45 | 45 | 45 | −45 | −35 | −55 | d |
| RELATIVE RELATION BETWEEN PHASE DIFFERENCE PLATE AND UPPER POLARIZING PLATE | | Θr1−Θp1 | ° | −45 | −45 | −45 | −45 | −55 | −35 | 45 | 45 | 45 | e |

FIG. 4B

| RESULT | ELEMENTS | SIGN | UNIT | EXAMPLE 6 | EXAMPLE 7 | EXAMPLE 8 | EXAMPLE 9 | EXAMPLE 10 | EXAMPLE 11 | EXAMPLE 12 | EXAMPLE 13 | EXAMPLE 14 |
|---|---|---|---|---|---|---|---|---|---|---|---|---|
| | | | | | | | EMBODIMENTS | | | | | |
| | BRIGHTNESS | | | ◎ | ◎ | △ | ○ | △ | △ | ○ | △ | △ |
| | COLORING IN FRONT SURFACE | | | ◎ | △ (SLIGHTLY YELLOW) | ○ (SLIGHTLY BLUE) | ○ (SLIGHTLY BLUE) | ○ | ◎ | ◎ | ○ | ○ |
| | VISUAL QUALITY OF IMAGE AT LOW ANGLE | | | ○ | △ (SLIGHTLY YELLOW AT ANGLE OF DIRECTION) | ○ | ○ | ○ | ○ | ○ | ○ | ○ |
| | ADVANTAGE OF REFLECTION PREVENTION | | | ◎ | ◎ | ◎ | ◎ | ◎ | ◎ | ◎ | ○ | ○ |

FIG. 5A

| CONDITION | ELEMENTS | SIGN | UNIT | EMBODIMENTS | | | CONDITION |
|---|---|---|---|---|---|---|---|
| | | | | EXAMPLE 15 | EXAMPLE 16 | EXAMPLE 17 | |
| | POLARIZING PLATE | Θp0 | ° | 10 | 10 | 10 | |
| | 1/4 WAVELENGTH PLATE | Θr0 | ° | 55 | 55 | 55 | |
| | | R0 (450 nm) | nm | 119 | 123 | 128 | |
| | | R0 (590 nm) | nm | 140 | 145 | 150 | |
| | | R0 (450 nm)/R0 (590 nm) | — | 0.850 | 0.850 | 0.850 | |
| | PHASE DIFFERENCE PLATE | Θr1 | ° | 135 | 135 | 135 | |
| | | R1 (450 nm) | nm | 124 | 124 | 124 | |
| | | R1 (590 nm) | nm | 120 | 120 | 120 | |
| | | R1 (450 nm)/R1 (590 nm) | — | 1.030 | 1.030 | 1.030 | |
| | UPPER POLARIZING PLATE | Θp1 | ° | 0 | 0 | 0 | |
| | RELATION BETWEEN POLARIZING PLATE AND UPPER POLARIZING PLATE | Θp1−Θp0 | | −10 | −10 | −10 | f |
| | RELATIVE RELATION BETWEEN 1/4 WAVELENGTH PLATE AND PHASE DIFFERENCE PLATE | R1 (590 nm)−R0 (590 nm) | nm | −20 | −25 | −30 | b |
| | | R1 (450 nm)/R1 (590 nm)−R0 (450 nm)/R0 (590 nm) | | 0.180 | 0.180 | 0.180 | a |
| | | Θr1−Θr0 | ° | 80 | 80 | 80 | c |
| | | R1 (450 nm)/R1 (450 nm) | — | 1 | 1 | 1 | g |
| | RELATIVE RELATION BETWEEN 1/4 WAVELENGTH PLATE AND POLARIZING PLATE | Θr0−Θp0 | ° | 45 | 45 | 45 | d |
| | RELATIVE RELATION BETWEEN PHASE DIFFERENCE PLATE AND UPPER POLARIZING PLATE | Θr1−Θp1 | ° | −45 | −45 | −45 | e |

FIG. 5B

| | ELEMENTS | SIGN | UNIT | EMBODIMENTS | | | |
|---|---|---|---|---|---|---|---|
| | | | | EXAMPLE 15 | EXAMPLE 16 | EXAMPLE 17 | |
| RESULT | BRIGHTNESS | | | ◎ | ◎ | ◎ | |
| | COLORING IN FRONT SURFACE | | | ◎ | ◎ | ◎ | |
| | VISUAL QUALITY OF IMAGE AT LOW ANGLE | | | ◎ | ◎ | ◎ | |
| | ADVANTAGE OF REFLECTION PREVENTION | | | ◎ | ◎ | ◎ | |

INPUT DEVICE AND DISPLAY DEVICE WITH INPUT FUNCTION

BACKGROUND

1. Technical Field

The present invention relates to an input device and a display device with an input function equipped with the input device.

2. Related Art

In recent years, there has been provided an electronic apparatus, such as a cellular phone, a car navigation, a personal computer, a ticket-vending machine, or a bank terminal, in which an input device is disposed on the face of an image forming device of the apparatus, where it is possible to input information with reference to an image displayed in the image forming device. In such an input device, as shown in FIG. 8, a resistive film type touch panel is configured with a first light-transmissive insulating substrate 10 and a second light-transmissive insulating substrate 20 which are disposed to face each other leaving a predetermined gap interposed therebetween, and light-transmissive resistive films 11 and 21 are formed on the surfaces of the substrates which face each other. When a liquid crystal device 5 is used as the image forming device, it is equipped with a liquid crystal panel 5a in which liquid crystal is disposed between a pair of substrates 50x and 60x, and an upper polarizing plate 81 (the upper polarizing plate of the image forming device) is disposed so as to overlap on the side of the liquid crystal panel 5a on which the touch panel 2 is disposed. When the liquid crystal panel 5a is a light-transmissive liquid crystal panel or a semi-transmissive reflective liquid crystal panel, a lower polarizing plate 82 and a backlighting device (not shown) are disposed on the opposite side of the liquid crystal panel 5a to which the touch panel 2 is disposed.

Herein, light is reflected from the interface of materials and the reflection degree increases when light enters a material with a higher refractive index through a material with a lower refractive index. Therefore, when outside light enters the touch panel 2, a high degree of reflection of light occurs from the surface of the resistive film 11 formed on the surface of the first insulating substrate 10. As a result, there may be problems in that the quality of image displayed on the liquid crystal device 5 deteriorates.

Therefore, it has been suggested to configure the input device by disposing a first ¼ wavelength plate 91x between the upper polarizing plate 81 and the touch panel 2, and by disposing a polarizing plate 93x for reflection prevention to overlap with a second ¼ wavelength plate 92x on the surface for the input operation on the touch panel 2. In such configuration, the retardation axis of the first ¼ wavelength plate 91x, the retardation axis of the second ¼ wavelength plate 92x, and the absorption axis of the polarizing plate 93x on the touch panel side respectively have angles in relation to the absorption axis of the upper polarizing plate 81 of 45°, 45°, and 0°. The retardation axis of the first ¼ wavelength plate 91x and the retardation axis of the second ¼ wavelength plate 92x are disposed to be at right angles to each other (refer to Japanese Patent No. 3854392 and JP-A-10-48625).

According to such configuration, among the outside light, linearly-polarized light transmitted from the polarizing plate 93x on the touch panel side travels through the second ¼ wavelength plate 92x to be circularly-polarized light and arrives at the touch panel 2. The light reflected from the touch panel 2 becomes inversely rotating circularly-polarized light. The light which travels through the second ¼ wavelength plate 92x is changed into linearly-polarized light in a direction perpendicular to the incident linearly-polarized light, and is not emitted to the outside from the polarizing plate 93x on the touch panel side. Moreover, since the retardation axes of the first ¼ wavelength plate 91x and the second ¼ wavelength plate 92x are disposed to be at right angles to each other, their optical properties cancel each other out. Therefore, display light transmitted from the upper polarizing plate 81 arrives at the polarizing plate 93x on the touch panel side as linearly-polarized light without having changed and the light is emitted.

However, in the case where a device is configured as shown in FIG. 8, it is necessary to dispose the retardation axes of the first ¼ wavelength plate 91x and the second ¼ wavelength plate 92x to be at right angles to each other. Therefore, the retardation axis of the first ¼ wavelength plate 91x, the retardation axis of the second ¼ wavelength plate 92x, and the absorption axis of the polarizing plate 93x on the touch panel side respectively have angles in relation to the absorption axis of the upper polarizing plate 81 that must be set to 45°, 45°, and 0°. For that reason, when the alignment of the absorption axis of the upper polarizing plate 81 is set, the directions of the retardation axes of the first ¼ wavelength plate 91x and the second ¼ wavelength plate 92x and the direction of the absorption axis of the polarizing plate 93x on the touch panel side must also be set. As a result, there are problems in that it is difficult to freely design the device. In the case of constructing, for example, a display device with an input function which is usable while wearing sunglasses having a polarizing property according to the configuration shown in FIG. 8, it is necessary to change the rubbing direction and the direction of the absorption axis of the upper polarizing plate 81 in the rubbing process during the manufacture of the liquid crystal panel 5a. As a result, there are problems in that it is difficult to standardize and decrease the price.

SUMMARY

An advantage of some aspects of the present invention is to provide an input device in which the absorption axis of a polarizing plate toward a touch panel provided on the touch panel side can be disposed in an arbitrary direction without changing the alignment of the absorption axis of the upper polarizing plate provided on the side of an image forming device from which display light is emitted; a display device with an input function equipped with the input device; and an electronic apparatus equipped with the display device with the input function.

According to a first aspect of the invention, there is provided a input device including: a light-transmissive touch panel, a phase difference plate disposed on the opposite side to an input operation surface of the touch panel, a ¼ wavelength plate disposed on the side of the input operation surface of the touch panel, and a polarizing plate on the touch panel side, which is disposed on the ¼ wavelength plate toward the input operation surface of the touch panel. A ratio R1 (450 nm)/R1 (590 nm) of the phase difference value R1 (450 nm) for the phase difference plate at a wavelength of 450 nm to the phase difference value R1 (590 nm) for the phase difference plate at a wavelength of 590 nm is greater than a ratio R0 (450 nm)/R0 (590 nm) of the phase difference value R0 (450 nm) for the ¼ wavelength plate at a wavelength of 450 nm to the phase difference value R0 (590 nm) for the ¼ wavelength plate at a wavelength of 590 nm, the phase difference value R1 (590 nm) for the phase difference plate at a wavelength of 590 nm is smaller than the phase difference value R0 (590 nm) for the ¼ wavelength plate at a wavelength of 590 nm, and an absolute value of an angle between the retardation axis of the phase difference plate and the retardation axis of the ¼ wavelength plate is in the range of 60° to 85°.

According to the above aspect of the invention, a ¼ wavelength plate represents a phase difference plate which alters the wavelength of light within the range of visible wavelengths to be ¼ wavelength.

According to the above aspect of the invention, when the angle between the retardation axis of a ¼ wavelength plate disposed on the side of an input operation surface of a touch panel and the retardation axis of a phase difference plate disposed toward an image forming device is changed from 90° to another predetermined angle, it is possible to increase the degree of freedom for designing the direction of the polarizing plate on the touch panel side. The generation of a tinted image or the decrease in display light quantity due to a shift in the relative position between the ¼ wavelength plate and the phase difference plate may be eliminated by making the phase difference value R1 (590 nm) for the phase difference plate smaller than the phase a difference value R0 (590 nm) for the ¼ wavelength plate and by making the wavelength dispersion R1 (450 nm)/R1 (590 nm) of the phase difference values for the phase difference plate higher than the wavelength dispersion R0 (450 nm)/R0 (590 nm) of the phase difference values for the ¼ wavelength plate a wavelength. As a result, an improved display property may be obtained even when the absolute value of the angle between the retardation axis of the phase difference plate and the retardation axis of the ¼ wavelength plate is in the range of 60° to 85°.

According to the above aspect of the invention, the touch panel is, for example, a resistive film type touch panel in which a pair of light-transmissive insulating substrate is disposed to face each other leaving a gap interposed therebetween and a light-transmissive resistive film is formed on the surfaces of the substrates which face each other.

According to a second aspect of the invention, a display device with an input function, which is equipped with the input device according to the first aspect of the invention, includes an image forming device provided on the opposite side of the phase difference plate to which the touch panel is disposed. In this case, the image forming device may be configured with a liquid crystal panel and an upper polarizing plate disposed between the liquid crystal panel and the phase difference plate. According to such configuration, due to the use of the upper polarizing plate, it is possible to obtain an image forming device forming an image with high contrast and a wide-viewing property.

According to the above aspect of the invention, it is preferable that the absolute value of the angle between the absorption axis of the polarizing plate on the touch panel side and the retardation axis of the ¼ wavelength plate is 45°±10° as an absolute value, an angle between the absorption axis of the upper polarizing plate and the retardation axis of the phase difference plate is 45°±10°, and the absolute value of the angle between the absorption axis of the polarizing plate on the touch panel side and the absorption axis of the upper polarizing plate is 5° to 30°. When the absolute value of the angle between the absorption axis of the polarizing plate on the touch panel side, which is disposed on the touch panel side, and the retardation axis of the ¼ wavelength plate is 45°±10°, and the absolute value of the angle between the absorption axis of the upper polarizing plate and the retardation axis of the phase difference plate is 45°±10°, it is possible to obtain a display device with an input function having high transmittance.

According to the above aspect of the invention, it is preferable that the ratio R1 (450 nm)/R0 (450 nm) of a phase difference value R1 (450 nm) for the phase difference plate to the phase difference value R0 (450 nm) for the ¼ wavelength plate is 0.80 to 1.15. When the ratio R1 (450 nm)/R0 (450 nm) of the phase difference value R1 (450 nm) for the phase difference plate to the phase difference value R0 (450 nm) for the ¼ wavelength plate is lower than 0.80, the transmittance of the touch panel tends to deteriorate, and when the ratio is greater than 1.15, a yellow tinge tends to be intensively displayed. Accordingly, it is preferable that the ratio R1 (450 nm)/R0 (450 nm) of the phase difference value R1 (450 nm) for the phase difference plate to the phase difference value R0 (450 nm) for the ¼ wavelength plate is 0.80 to 1.15.

According to the above aspect of the invention, it is preferable that the ¼ wavelength plate or/and the phase difference plate is/are formed of a plurality of layers. According to such configuration, a ¼ wavelength plate and the phase difference plate having an arbitrary wavelength dispersion of the phase difference values.

According to a third aspect of the invention, there is provided an electronic apparatus such as a cellular phone, a car navigation, a personal computer, a ticket-vending machine, or a bank terminal including the display device with the input function according to the above aspect of the invention.

BRIEF DESCRIPTION OF THE DRAWINGS

The invention will be described with reference to the accompanying drawings, wherein like numbers reference like elements.

FIG. 3 is an explanatory diagram illustrating evaluation results of a display device with an input function and an input device according to Examples 1 to 5 of the invention.

FIG. 4 is an explanatory diagram illustrating evaluation results of the display device with the input function and the input device according to Examples 6 to 14 of the invention.

FIG. 5 is an explanatory diagram illustrating evaluation results of the display device with the input function and the input device according to Examples 15 to 17 of the invention.

DESCRIPTION OF EXEMPLARY EMBODIMENTS

Figure 8:
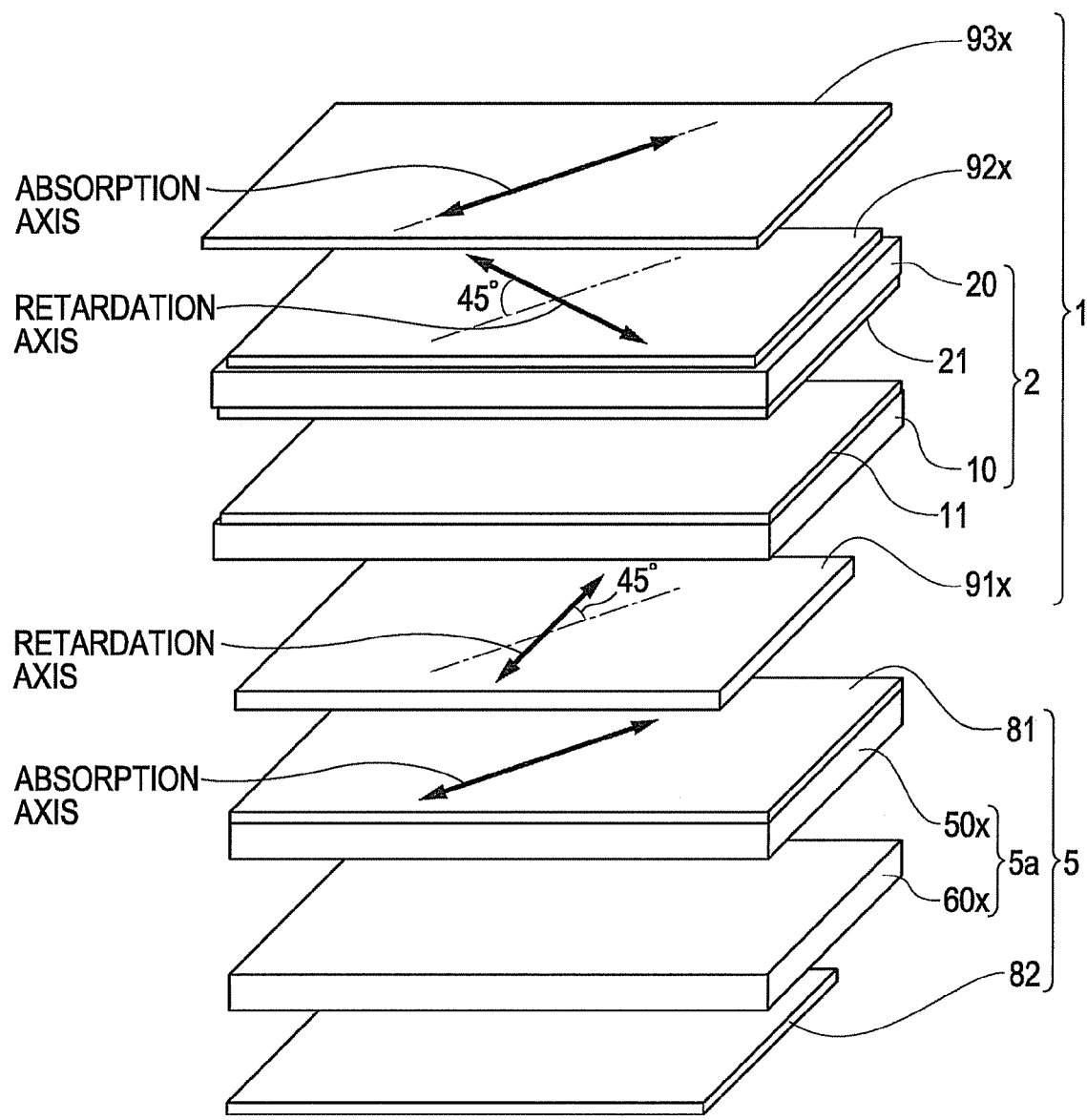
FIG. 8 is an explanatory diagram schematically illustrating a configuration of an existing display device with an input function.

Embodiment of the invention will be described with reference to the drawings. In the drawings referred in the following description, respective layers and respective constituent elements are appropriately shown with different scales and in different numbers in order to permit the layers and constituent elements to be recognizable in the drawings. In addition, in the following description, the same reference numerals are given to the constituent elements having a function common to the constituent elements described with reference to FIG. 8 in order to easily know a correspondent relation.

Overall Configuration

Figure 1A:
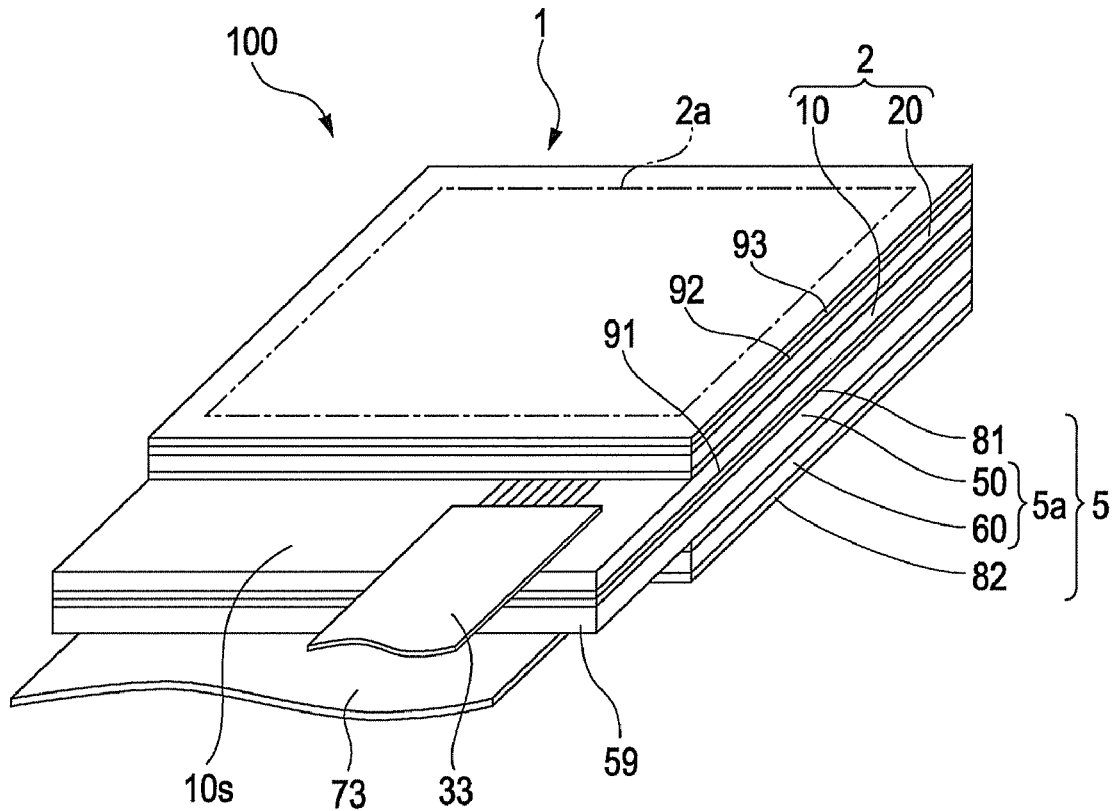
FIGS. 1A and 1B are respectively explanatory diagrams schematically illustrating the overall configuration of a display device with an input function and schematically illustrating the configuration of the cross-section of the display device according to the invention.
Figure 1B:
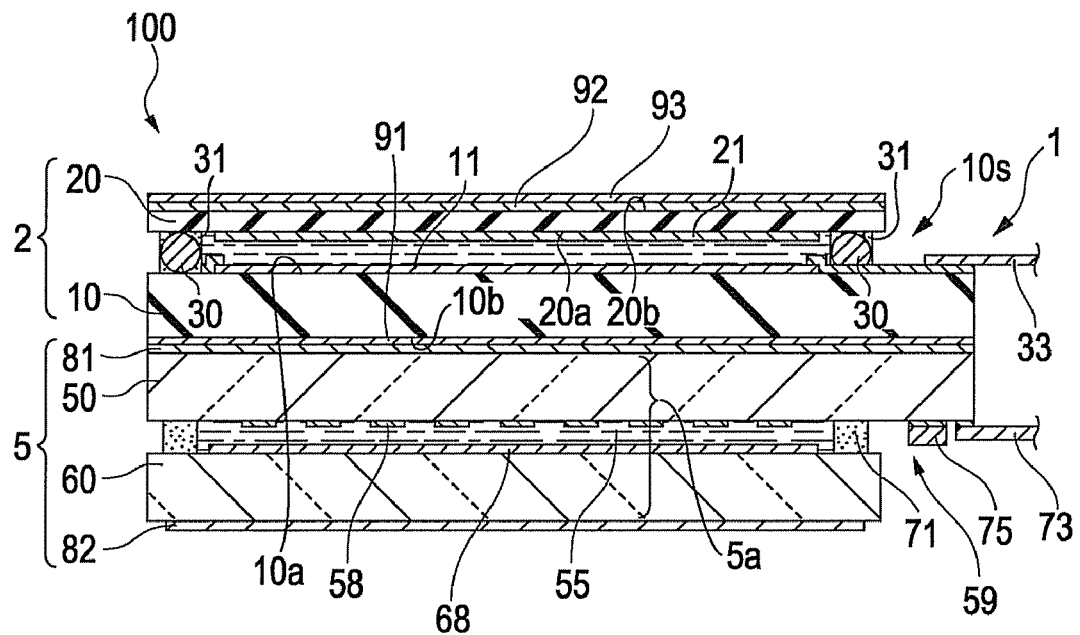
Figure 2:
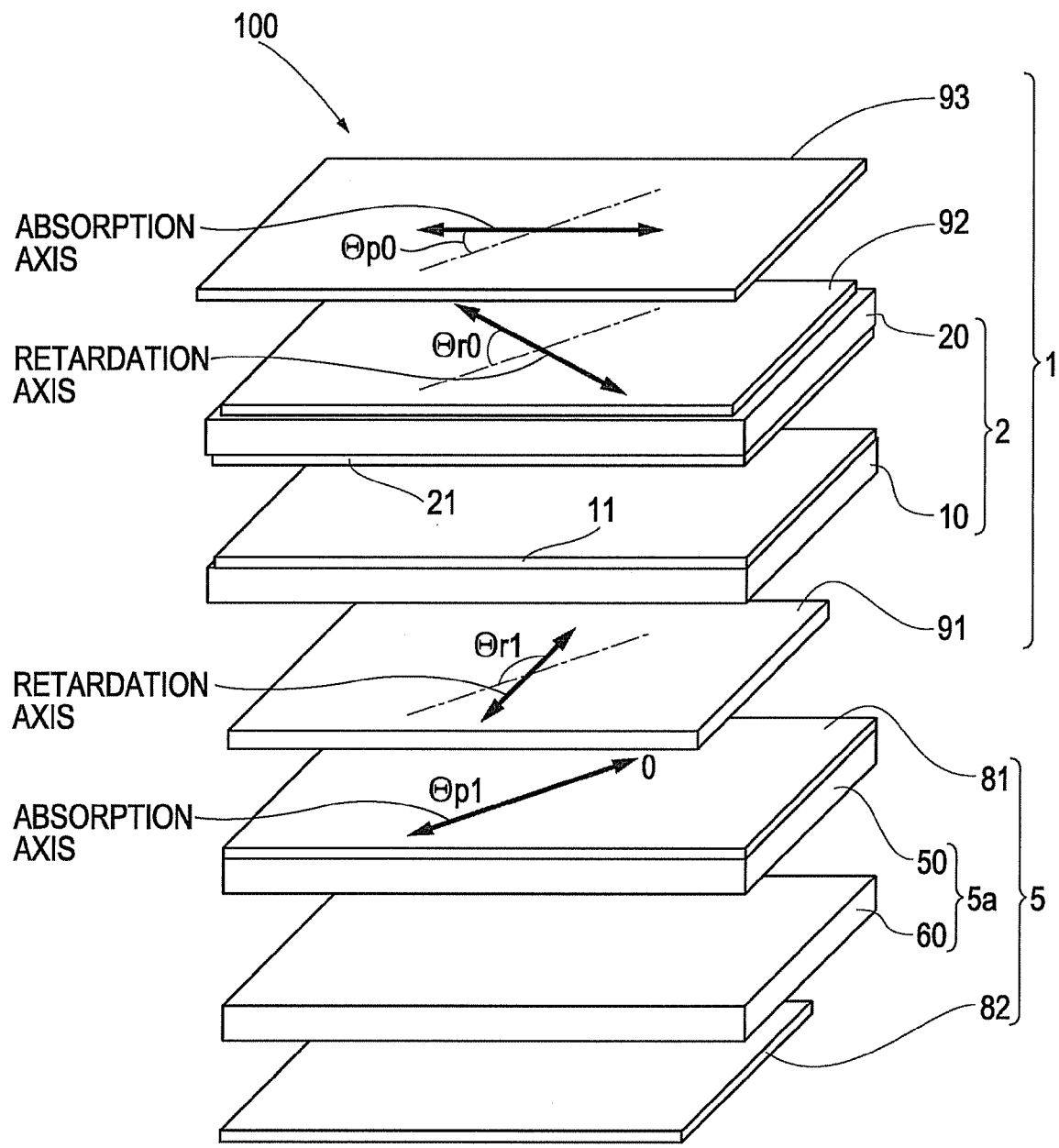
FIG. 2 is an explanatory diagram schematically illustrating a configuration of a display device with an input function device according to the invention.

FIGS. 1A and 1B are explanatory diagrams schematically illustrating the overall configuration of a display device with an input function and schematically illustrating the configuration of the cross-section of the display device according to the invention, respectively. FIG. 2 is an explanatory diagram schematically illustrating a configuration of a display device with an input function device according to the invention. In FIG. 1B, electrodes of an input device and pixel electrodes, counter electrodes, and the like of a liquid crystal device are shown simply in the numbers and the like. In addition, in FIG. 2, the absorption axis of a polarizing plate, the retardation axis of a phase difference plate, and the retardation axis of a ¼ wavelength plate are shown as solid arrows and a base line which makes an angle with such axes is shown as a dashed line.

In FIGS. 1A, 1B and FIG. 2, a display device 100 with an input function according to this embodiment includes a liquid crystal device 5 as an image forming device and a resistive film type input device 1 which is disposed to overlap on the surface of the liquid crystal device 5 from which display light is emitted.

The liquid crystal device 5 is equipped with an active matrix liquid crystal panel 5a which may be a light-transmissive type, a reflective type, or a semi-transmissive type. The liquid crystal panel 5a may be a TN (Twisted Numatic) type, a VA (Virtical Alignment) type, an IPS (In Place Switching) type, or a FFS (Fringe Field Switching) type. According to this embodiment, the liquid crystal panel 5a is a light-transmissive type. Therefore, a backlighting device (not shown) is disposed on the opposite side of the liquid crystal panel from which display light is emitted. In the liquid crystal device 5, an upper polarizing plate 81 is disposed to overlap the side of the liquid crystal panel 5a from which display light is emitted, and a lower polarizing plate 82 is disposed to overlap with the opposite side thereof. The liquid crystal panel 5a is equipped with a light-transmissive element substrate 50 disposed on the side from which display light is emitted and a light-transmissive counter substrate 60 disposed to face the element substrate 50. The counter substrate 60 and the element substrate 50 are bonded to each other with a sealing member 71 having a frame shape, and a liquid crystal layer 55 is maintained within the area surrounded by the sealing member 71 between the counter substrate 60 and the element substrate 50.

In the element substrate 50, a plurality of pixel electrodes 58 and an alignment film (not shown) are formed on the surface opposed to the counter substrate 60. In the counter substrate 60, a common electrode 68 and an alignment film (not shown) formed on the surface opposed to the element substrate 50. Alternatively, the common electrode 68 may be formed on the element substrate 50. Moreover, the counter substrate 60 may be disposed on the side of emitting the display light. On the element substrate 50, a driving IC 75 is COG-mounted in an extended area 59 extended from the edge of the counter substrate 60, and a flexible substrate 73 is connected to the extended area 59. In addition, switching elements formed on the element substrate 50 and a driving circuit may be formed together on the element substrate 50. In the liquid crystal device 5 composed of such a configuration, the alignment of liquid crystal molecules forming the liquid crystal layer 55 may be controlled by rubbing the alignment film formed on the element substrate 50 and the counter substrate 60.

The input device 1 includes a resistive film type touch panel 2 disposed to overlap with the liquid crystal device 5. The middle area of the resistive film type touch panel 2 is used as an input area 2a. The resistive film type input panel 2 includes a first insulating substrate 10 (a light-transmissive insulating substrate) formed of a glass plate, a plastic plate, a plastic film or the like and having a light-transmitting property and a second insulating substrate 20 (the light-transmissive insulating substrate) formed of a glass plate, a plastic plate, a plastic sheet, or the like and having a light-transmitting property. In this embodiment, both the first insulating substrate 10 and the second insulating substrate 20 are formed of the glass plate. The first insulating substrate 10 and the second insulating substrate 20 are attached to each other by a sealing member 31 having a frame shape so that first surfaces 10a and 20a are opposed to each other with a predetermined gap (an airspace) interposed therebetween. In addition, when the predetermined gap is interposed between the first insulating substrate 10 and the second insulating substrate 20, a space may be interposed between the first insulating substrate 10 and the second insulating substrate 20.

In this embodiment, the second insulating substrate 20 is disposed on a side of an input operation and the first insulating substrate 10 is disposed on a side of the liquid crystal device 5. With such a configuration, a second surface 20b of the second insulating substrate 20 faces the side of the input operation and a second surface 10b of the first insulating substrate 10 faces the side of the liquid crystal device 5. In the resistive film type touch panel 2 having such a configuration, when an input operation is carried out, the second insulating substrate 20 is required to be bent. Therefore, the second insulating substrate 20 is thinner than the first insulating substrate 10 and has a flexible property. Both the first insulating substrate 10 and the second insulating substrate 20 have a rectangular shape of which sides extend in X and Y directions.

On the first surface 10a of the first insulating substrate 10, a flexible substrate 33 is connected to an extended area 10s extended from the edge of the second insulating substrate 20. The flexible substrate 33 is a wiring member which electrically connects the resistive film type touch panel 2 to an input location detecting unit (not shown) or the like. A flexible substrate or the like is not connected to the second insulating substrate 20. However, when conductive particles are mixed into the sealing member 31 having the frame shape, electric connection between the first insulating substrate 10 and the second insulating substrate 20 is possible. With such a configuration, electricity feeding or signal exchange between the first insulating substrate 10 and the second insulating substrate 20 is possible.

In the touch panel 2, a sheet-shaped translucent resistive film 11 composed of an ITO (Indium Tin Oxide) film is formed all over an input area 2a on the first surface 10a of the first insulating substrate 10. On the first surface 20a of the second insulating substrate 20, a sheet-shaped translucent resistive film 21 composed of an ITO (Indium Tin Oxide) film is formed on an area thereon appeared to overlap the resistive film 11 formed on the first insulating substrate 10 from a planar view. The touch panel 2 having such configuration has a light-transmissive property and no polarizing property or little polarizing property.

Measures for Outside Light Reflection

Summary of Configuration

In a display device 100 with the input function and an input device 1 described with reference to FIGS. 1A, 1B, and 2, when light entered from the side of the surface for an input operation of the touch panel 2 and the light travels from a material having a lower refractive index to a material having a higher refractive index, a high level of reflection of the light occurs at the interface between the materials. Specifically, light entered from the surface for the input operation of the touch panel 2 is highly reflected from the surface of the resistive film 11 on the first insulating substrate 10. Because of such a reflection, the quality of an image formed in the liquid crystal device 5 deteriorates.

Therefore, in this embodiment, a phase difference plate 91 is disposed between the upper polarizing plate 81 of the liquid crystal device 5 and the touch panel 2. In addition, a ¼ wavelength plate 92 is disposed on the side of the input operation surface of the touch panel 2 and a polarizing plate 93 on the touch panel side for reflection prevention is disposed on the side more toward the input operation surface than the ¼ wavelength plate 92. Accordingly, the display device 100 with the input function according to this embodiment has a configuration in which the lower polarizing plate 82, the liquid crystal panel 5a (the element substrate 50 and the counter substrate 60), the upper polarizing plate 81, the phase difference plate 91, the touch panel 2 (the first insulating substrate 10, an airspace, the second insulating substrate 20), the ¼ wavelength plate 92, and the polarizing plate 93 on the touch panel side are laminated in order. In addition, the lower polarizing plate 82, the liquid crystal panel 5a, the upper polarizing plate 81, the phase difference plate 91, the touch panel 2, the ¼ wavelength plate 92, and the polarizing plate 93 on the touch panel side are closely attached to the members adjacent to each other.

In addition, in this embodiment, on the basis of evaluation results from each of the Examples and Comparative Examples shown in FIGS. 3, 4, and 5, the relative relation between the phase difference plate 91 and the upper polarizing plate 81, the relative relation between the ¼ wavelength plate 92 and the phase difference plate 91, and the relative relation between the ¼ wavelength plate 92 and the polarizing plate 93 on the touch panel side are set according to the conditions described below.

For example, the absolute value of the angle between the absorption axis of the polarizing plate 93 on the touch panel side and the retardation axis of the ¼ wavelength plate 92 is 45°±10°. Therefore, in the display device 100 with the input function according to this embodiment, in the same manner as in the configuration shown in FIG. 8, linearly-polarized light transmitted from the polarizing plate 93 on the touch panel side, among the outside light, travels through the second ¼ wavelength plate 92 to be circularly-polarized light or nearly circularly-polarized light and arrives at the touch panel 2. The light reflected from the touch panel 2 becomes inversely rotating circularly-polarized light or nearly circularly-polarized light. The light which travels through the second ¼ wavelength plate 92 is changed into linearly-polarized light or nearly linearly-polarized light in a direction perpendicular to the incident linearly-polarized light, and the light is not emitted to the outside from the polarizing plate 93 on the touch panel side. For that reason, it is possible to prevent the emission of reflected light which incident from the surface for the input operation of the touch panel 2.

The reason why the absorption axis of the upper polarizing plate 81 and the absorption axis of the polarizing plate 93 on the touch panel side are arranged not to be parallel to each other but to be at a given angle is that when linearly-polarized display light transmitted from the upper polarizing plate 81 passes through the phase difference plate 91, the light needs to be changed into circularly-polarized light or nearly circularly-polarized light. That is, if light passes through the phase difference plate 91 and is changed into circularly-polarized light or nearly circularly-polarized light, and the light is changed into linearly-polarized light when it passes through the ¼ wavelength plate 92. Accordingly, it is possible to emit light from the polarizing plate 93 on the touch panel side.

In order to change linearly-polarized display light transmitted from the upper polarizing plate 81 into circularly-polarized light or nearly circularly-polarized light after passing through the phase difference plate 91, magnitude relation between a dispersion value of the phase difference values for the phase difference plate 91 and a dispersion value of the phase difference values for the upper polarizing plate 81 is set according to the predetermined conditions by arranging the phase difference plate 91 and the upper polarizing plate 81 according to their relative positional relation. Therefore, even when the angle made by the retardation axis of the ¼ wavelength plate 92 disposed on the side of the input operation surface of the touch panel 2 and with the retardation axis of the phase difference plate 91 disposed on the side of the liquid crystal device 5 is changed from 90° to other predetermined angle, it is possible to suppress the generation of a tinted image.

In the display device 100 with the input function and the input device 1 according to the invention, it is possible to arrange the polarizing plate 93 on the touch panel side for reflection prevention disposed on the side of the touch panel 2 in any directions without changing an alignment of the absorption axis of the upper polarizing plate 81. Therefore, it is possible to freely set a relation between the polarizing plate 93 on the touch panel side and the upper polarizing plate 81.

Specific Configuration

In addition to FIGS. 1 and 2, with reference to FIGS. 3 to 6, specific configurations will be described for the measures for dealing with reflection on the display device 100 with the input function and the input device 1 according to the invention.

Figure 6:
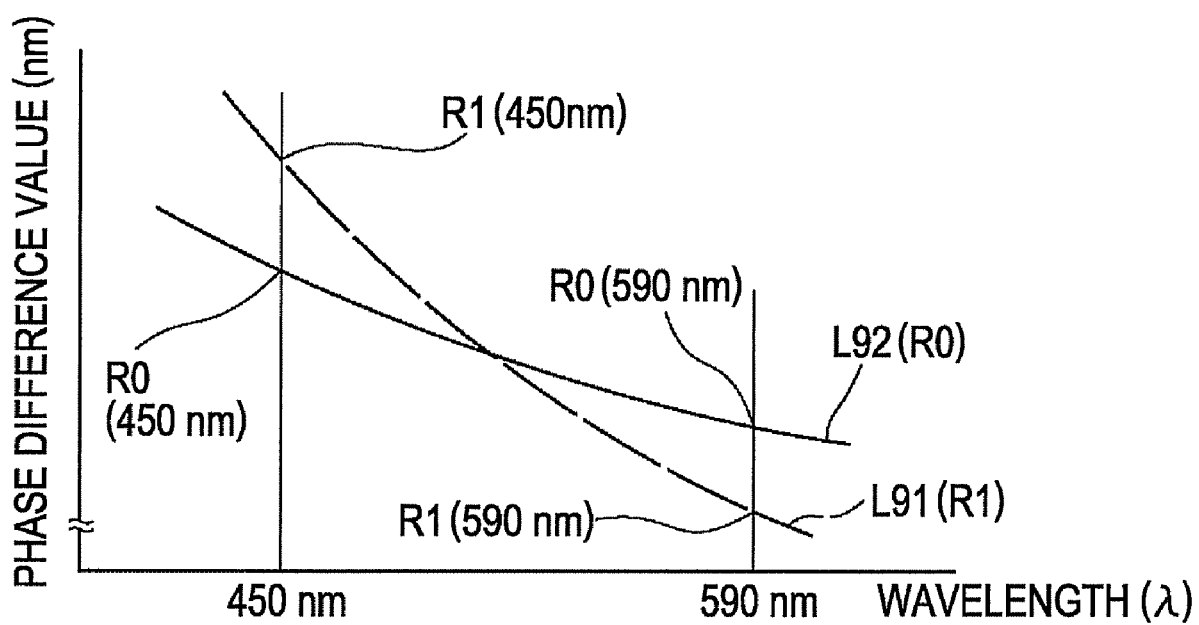
FIG. 6 is an explanatory diagram schematically illustrating wavelength dependence of phase difference values for the phase difference plate and the ¼ wavelength plate used in the display device with the input function and the input device according to the invention.

FIGS. 3, 4, and 5 are explanatory diagrams illustrating the evaluation results respectively obtained by changing the relative relation between the phase difference plate and the upper polarizing plate, the relative relation between the ¼ wavelength plate and the phase difference plate, and the relative relation between the ¼ wavelength plate and the polarizing plate in the display device 100 with the input function and the input device 1 according to the Examples of the invention. Herein, FIG. 3 is an explanatory diagram illustrating evaluation results of the display device with the input function and the input device according to Examples 1 to 5 of the invention. FIG. 4 is an explanatory diagram illustrating the evaluation results of the display device with the input function and the input device according to Examples 6 to 14 of the invention. FIG. 5 is an explanatory diagram illustrating the evaluation results of the display device with the input function and the input device according to Examples 15 to 17 of the invention. FIG. 6 is an explanatory diagram schematically illustrating the wavelength dependence of phase difference values for the phase difference plate and the ¼ wavelength plate used in the display device with the input function and the input device according to the invention. In FIG. 6, the property of the phase difference plate 91 is shown as a dashed line L91 and the property of the ¼ wavelength plate 92 is shown as a solid line L92.

In addition, each property mentioned in FIGS. 3 to 5 and in the following description is defined as follows:

Angle of the absorption axis of the polarization plate 93 on the touch panel side: θp0

Angle of the retardation axis of the ¼ wavelength plate 92: θr0

Phase difference value for the ¼ wavelength plate 92 at a wavelength of 450 nm: R0 (450 nm)

Phase difference value for the ¼ wavelength plate 92 at a wavelength of 590 nm: R0 (590 nm)

Dispersion value of the phase difference values for the ¼ wavelength plate 92: R0 (590 nm)/R0 (450 nm)

Angle of the retardation axis of the phase difference plate 91: θr1

Phase difference value for the phase difference plate 91 at a wavelength of 450 nm: R1 (450 nm)

Phase difference value for the phase difference plate 91 at a wavelength of 590 nm: R1 (590 nm)

Dispersion value of the phase difference values for the phase difference plate 91: R1 (590 nm)/R1 (450 nm)

Angle of the absorption axis of the upper polarizing plate 81: θp1

The condition which prescribes the relation between the polarization plate 93 on the touch panel side and the upper polarizing plate 81 is defined as follows:

Angle between the absorption axes of the plates: θp1−θp0

The conditions which prescribe a relation between the ¼ wavelength plate 92 and the phase difference plate 91 is defined as follows:

Magnitude relation between the phase difference values for the plates: R1 (590 nm)−R0 (590 nm)

Magnitude relation between the dispersion values of the phase difference values for the plates: R1 (590 nm)/R1 (450 nm)−R0 (590 nm)/R0 (450 nm)

Angle between the retardation axes of the plates: θr1−θr0

Phase difference value ratio between the plates at 450 nm: R1 (450 nm)/R0 (450 nm)

The condition which prescribes a relation between the ¼ wavelength plate 92 and the polarization plate 93 on the touch panel side is defined as follows:

Angle between the retardation axis and the absorption axis: θr0−θp0

The condition which prescribes the relative relation between the phase difference plate 91 and the upper polarizing plate 81 is defined as follows:

Angle between the retardation axis and the absorption axis: θr1−θp1

In addition, each angle shown in FIGS. 3 to 5 relative to the base line shown as a dashed line in FIG. 2 is represented as a positive value in the clockwise direction from the base line. In this embodiment, since each angle is made based on the absorption axis of the upper polarizing plate 81, the angle θp1 of the absorption axis of the upper polarizing plate 81 is represented as 0°.

Evaluation Result

The above-mentioned various conditions are varied according to Examples 1 to 17 and Comparative Examples 1 and 2, and each condition is shown in FIGS. 3A to 5A. In addition, results from evaluation on the brightness of an image, generation of a tinted image from a front view, visual quality of a visual image at a lower angle, and reflection prevention effect in Examples 1 to 17 and Comparative Examples 1 and 2 are shown in FIGS. 3B to 5B. The evaluations are carried out as 4-stage evaluations. The most satisfactory embodiments are given '⊙', less satisfactory embodiments are given '○', less inferior embodiments are given 'Δ', and the most inferior embodiments are given '×'. In the rightmost columns in FIGS. 3A, 4A, 5A, (a) to (g) is given to sections corresponding to conditions described below.

Specific results from each Example will be described below. When the following conditions are satisfied, even when the relation between the polarizing plate 93 on the touch panel side and the upper polarizing plate 81 is freely set, it is possible to confirm that the emission of reflected light incident from the side of the surface for the input operation of the touch panel 2, can be prevented, and there can be displayed an image having high quality.

The First Condition

Condition A

A ratio R1 (450 nm)/R1 (590 nm) of the phase difference value R1 (450 nm) for the phase difference plate 91 at a wavelength of 450 nm to the phase difference value R1 (590 nm) at a wavelength of 590 nm for the phase difference plate 91 is greater than a ratio R0 (450 nm)/R0 (590 nm) of the phase difference value R0 (450 nm) for the ¼ wavelength plate 92 at a wavelength of 450 nm to the phase difference value R0 (590 nm) at a wavelength of 590 nm for the ¼ wavelength plate 92. That is, as shown in FIG. 6, in the relative relation between the ¼ wavelength plate 92 and the phase difference plate 91, a condition is set in that the value 'R1 (590 nm)/R1 (450 nm)−R0 (590 nm)/R0 (450 nm)' which prescribes a magnitude relation between the dispersion values of the phase difference values for the plates is a positive value.

Condition B

A phase difference value R1 (590 nm) for the phase difference plate 91 at a wavelength of 590 nm is smaller than a phase difference value R0 (590 nm) for the ¼ wavelength plate 92 at a wavelength of 590 nm. That is, in the relative relation between the ¼ wavelength plate 92 and the phase difference plate 91, the value 'R1 (590 nm)−R0 (590 nm)' which prescribes the magnitude relation between the phase difference values for the plates is a negative value.

Condition C

An absolute value of an angle between the retardation axis of the phase difference plate 91 and the retardation axis of the ¼ wavelength plate 92 is in the range of 60° to 85°. That is, in the relative relation between the ¼ wavelength plate 92 and the phase difference plate 91, the value 'θr1−θr0' which prescribes the absolute value of the angle between the retardation axes is in the range of 60° to 85°.

The Second Condition

Condition D

An absolute value of an angle between the absorption axis of the polarizing plate 93 on the touch panel side and the retardation axis of the ¼ wavelength plate 92 is 45°±10°. That is, in the relative relation between the ¼ wavelength plate 92 and the polarizing plate 93 on the touch panel side, the value 'θr0−θp0' which prescribes the absolute value of the angle between the retardation axis and the absorption axis is 45°±10°.

Condition E

An absolute value of an angle between the absorption axis of the upper polarizing plate 81 and the retardation axis of the phase difference plate 91 is 45°±10°. That is, in the relative relation between the phase difference plate 91 and the upper polarizing plate 81, the value 'θr1−θp1' which prescribes the absolute value of the angle between the retardation axis and the absorption axis is 45°±10°.

Condition F

An absolute value of an angle between the absorption axis of the polarizing plate 93 on the touch panel side and the absorption axis of the upper polarizing plate 81 is 5°±30°. That is, in a relation between the polarizing plate 93 on the touch panel side and the upper polarizing plate 81, the value 'θp1−θp0' which prescribes the absolute value of the angle between the absorption axes is 5°±30°.

The Third Condition
Condition G

A ratio R1 (450 nm)/R0 (450 nm) of a phase difference value R1 (450 nm) of the phase difference plate 91 to a phase difference value R0 (450 nm) of the ¼ wavelength plate 92 is 0.80 to 1.15. That is, in the relative relation between the ¼ wavelength plate 92 and the phase difference plate 91, the phase difference value ratio R1 (450 nm)/R0 (450 nm) at 450 nm is 0.80 to 1.15.

In other words, when the device satisfies the above-mentioned Conditions A, B, C, D, E, and G, it is possible to achieve the Condition F. Therefore, it is possible to arbitrarily set the absolute value of the angle between the absorption axis of the polarizing plate 93 on the touch panel side and the absorption axis of the upper polarizing plate 81 within the range of 5° to 30°.

EVALUATION RESULTS FROM EXAMPLES 1 TO 5 AND COMPARATIVE EXAMPLES 1 AND 2

As shown in FIG. 3, Examples 1 to 5 which satisfy all the Conditions A to G, Comparative Example 1 which satisfies the Conditions C to G but does not satisfy the Conditions A and B, and Comparative Example 2 which satisfies the Conditions B to F but does not satisfy the Conditions A and G were evaluated.

As a result, in Examples 1 to 5, one of the conditions in which the absolute value of the angle between the absorption axes of the polarizing plate 93 on the touch panel side and the upper polarizing plate 81 is 5° to 30° is set, it is possible to obtain sufficient properties.

On the other hand, as shown in Comparative Examples 1 and 2, when R1 (590 nm) and R0 (590 nm) have the same value or when R1 (450 nm)/R1 (590 nm) and R0 (450 nm)/R0 (590 nm) have the same value, problems in that an image is darkened and an image is colored considerably yellow occur.

In Examples 4 and 5, the same properties are shown. That is, even when the positive and the negative values of the angle made by each axis are swapped, the properties are the same as long as the absolute values are the same. Accordingly, it is possible to set the angle between the absorption axes of the polarizing plate 93 on the touch panel side and the upper polarizing plate 81 to be any values within 5° to 30° or 5° to −30°.

The ¼ wavelength plate 92 used for evaluation is a phase difference plate which alters a wavelength of 562 nm to be the ¼ wavelength thereof.

EVALUATION RESULTS FROM EXAMPLES 6 TO 8

As shown in FIG. 4, Examples 6 to 8 were evaluated in which a phase difference plate having a smaller dispersion value R0 (450 nm)/R0 (590 nm) as compared to that used in Examples 1 to 5 was used as the ¼ wavelength plate 92. The ¼ wavelength plate 92 used in this evaluation is a phase difference plate which alters a wavelength of 534 nm to be the ¼ wavelength thereof. Example 6 satisfies all the Conditions A to G.

Examples 7 and 8 are the same as Example 6 except that the value R1 (450 nm)/R0 (450 nm) is changed. Examples 7 and 8 satisfy the Conditions A to F but do not satisfy the Condition G.

When Example 6 is compared with Examples 7 and 8, it is found that when the value R1 (450 nm)/R0 (450 nm) is large, the image tends to be yellow in color and when the value R1 (450 nm)/R0 (450 nm) is small, the image is darkened. However, the problems do not cause any troubles in practical use.

EVALUATION RESULTS EXAMPLES 9 TO 11

As shown in FIG. 4, Examples 9 to 11 were evaluated in which the angle θr0 of the ¼ wavelength plate 92 and the angle θr1 of the phase difference plate 91 were changed. Examples 9 to 11 also satisfy all the Conditions A to G.

Herein, in Examples 10 and 11, the angles between the retardation axis of the phase difference plate and the absorption axis of the upper polarizing plate are different from that in Example 9. In Examples 9 to 11, an image is slightly darkened but it does not cause any troubles in practical use.

EVALUATION RESULTS FROM EXAMPLES 12 TO 14

As shown in FIG. 4, Examples 12 to 14 are examples in which the angle between the retardation axis of the ¼ wavelength plate 92 and the absorption axis of the polarizing plate 93 on the touch panel side is changed by changing the angle θp0 of the polarizing plate 93 on the touch panel side. In addition, in Examples 13 to 14, the angles between the retardation of the ¼ wavelength plate and the absorption axis of the polarizing plate are changed in comparison to that in Example 12. Example 12 and 13 satisfy all the Conditions A to G. Example 14 satisfies the Conditions A to E and G but does not satisfy the Condition F. However, in Examples 12 to 14, satisfactory properties can be obtained. In Examples 13 and 14, a reflection prevention effect slightly deteriorates compared to Example 12 but it does not cause any troubles in practical use.

EVALUATION RESULTS FROM EXAMPLES 15 TO 17

As shown in FIG. 5, in Examples 15 to 17, a plate, which has the same dispersion value R0 (450 nm)/R0 (590 nm) and the different phase difference value as compared with the other Examples, was used as the ¼ wavelength plate 92. The ¼ wavelength plates 92 used in Examples 15, 16, and 17 respectively have the phase difference values at which the wavelength is changed to ¼ wavelength of 534 nm, 572 nm, and 608 nm. Since Examples 15 to 17 satisfy all the Conditions A to G, satisfactory properties can be obtained.

OTHER EMBODIMENTS

In the above embodiment, as the substrates (the first insulating substrate 10 and the second insulating substrate 20) of the touch panel 2, a glass substrate is used but a plastic film may be used. In addition, as the plastic film, a film showing a certain phase difference may be used.

Figure 7A:
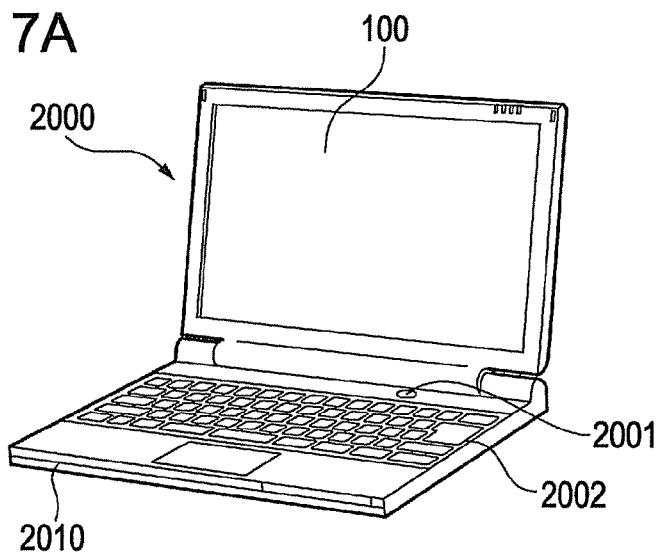
FIG. 7 is an explanatory diagram of an electronic apparatus to which a display device with an input function according to the invention is applied.
Figure 7B:
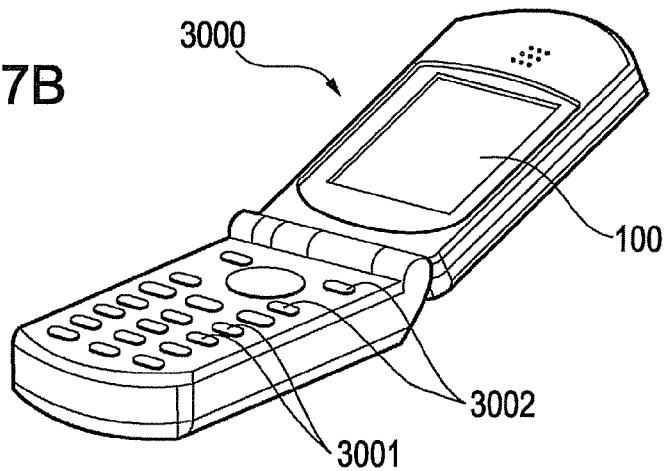
Figure 7C:
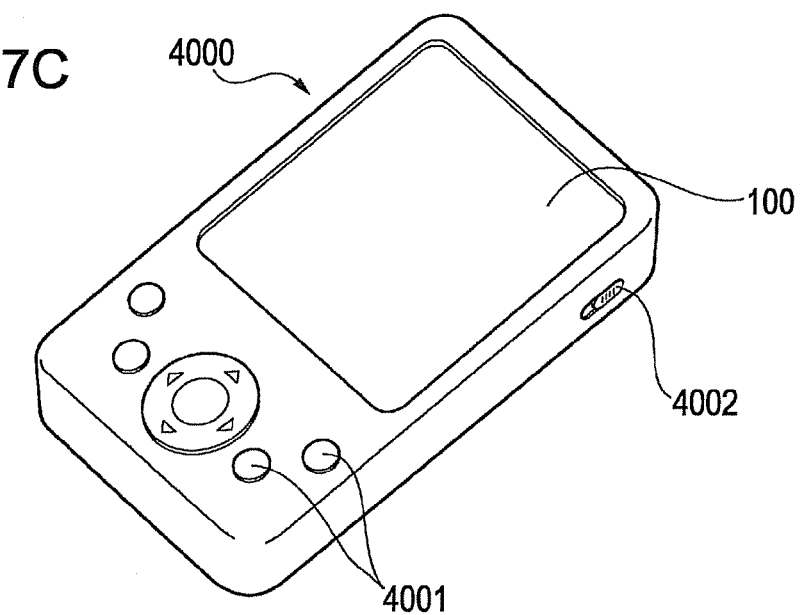

As the ¼ wavelength plate 92 and the phase difference plate 91 used in the above embodiment, a plurality of the plate layers may be laminated to satisfy the specific properties. To be specific, a ¼ wavelength plate and a ½ wavelength plate, which have different wavelength dispersions from each other, may be combined to be the used as the ¼ wavelength plate 92 having the specific dispersion value. In addition, a plurality of phase difference plates having different wavelength dispersions and different phase difference values from each other may be combined to form the phase difference plate 91 having the specific dispersion value and phase difference value.
Mounted Example to Electronic Apparatus Next, an electronic apparatus to which the display device 100 with the input function according to the above-described embodiments is applied will be described. FIG. 7A shows the configuration of a portable personal computer including the display device 100 with the input function. A personal computer 2000 includes the display device 100 with the input function as a display unit and a main body 2010. The main body 2010 is provided with a power switch 2001 and a keyboard 2002. FIG. 7B shows the configuration of a cellular phone including the display device 100 with the input function. A cellular phone 3000 includes a plurality of operation buttons 3001, scroll buttons 3002, and the display device 100 with the input function as a display unit. By operating the stroll buttons 3002, a screen displayed on the display device 100 with the input function is scrolled. FIG. 7C shows the configuration of a personal digital assistant (PDA) to which the display device 100 with the input function is applied. A personal digital assistant 4000 includes a plurality of operation buttons 4001, a power switch 4002, and the display device 100 with the input function as a display unit. When the power switch 4002 is operated, various kinds of information such as an address book and a schedule book are displayed on the display device 100 with the input function.

Examples of the electronic apparatus to which the display device 100 with the input function is applied include a digital still camera, a liquid crystal TV, a view finder type or monitor direct vision-type video tape recorder, a car navigation apparatus, a pager, an electronic pocket book, a calculator, a word processor, a workstation, a television phone, a POS terminal, and a bank terminal, as well as the apparatuses shown in FIG. 7. As a display unit of these various electronic apparatuses, the above-described display device 100 with the input function can be applied.

The entire disclosure of Japanese Patent Application No. 2008-245390, filed Sep. 25, 2008 is expressly incorporated by reference herein.

What is claimed is:

1. An input device comprising:
    a light-transmissive touch panel,
    a phase difference plate disposed on the opposite side to an input operation surface of the touch panel,
    a ¼ wavelength plate disposed on the side of the input operation surface of the touch panel, and
    a polarizing plate on the touch panel side, which is disposed on the ¼ wavelength plate toward the input operation surface of the touch panel,
    wherein a ratio R1 (450 nm)/R1 (590 nm) of the phase difference value R1 (450 nm) for the phase difference plate at a wavelength of 450 nm to the phase difference value R1 (590 nm) for the phase difference plate at a wavelength of 590 nm is greater than a ratio R0 (450 nm)/R0 (590 nm) of the phase difference value R0 (450 nm) for the ¼ wavelength plate at a wavelength of 450 nm to the phase difference value R0 (590 nm) for the ¼ wavelength plate at a wavelength of 590 nm,
    the phase difference value R1 (590 nm) for the phase difference plate at a wavelength of 590 nm is smaller than the phase difference value R0 (590 nm) for the ¼ wavelength plate at a wavelength of 590 nm, and
    an absolute value of an angle between the retardation axis of the phase difference plate and the retardation axis of the ¼ wavelength plate is in the range of 60° to 85°.

2. The input device according to claim 1,
    wherein the touch panel is a resistive film type touch panel in which a pair of light-transmissive insulating substrate is disposed to face each other leaving a gap interposed therebetween and a light-transmissive resistive film is formed on the surfaces of the substrates facing each other.

3. A display device with an input function, which is equipped with the input device according to claim 1, comprising:
    an image forming device provided on the opposite side to the phase difference plate on which the touch panel is disposed.

4. The display device with an input function according to claim 3,
    wherein the image forming device is equipped with a liquid crystal panel and an upper polarizing plate in the image forming device disposed between the liquid crystal panel and the phase difference plate.

5. The display device with an input function according to claim 4,
    wherein an absolute value of an angle between the absorption axis of the polarizing plate on the touch panel side and the retardation axis of the ¼ wavelength plate is 45°±10°,
    an absolute value of an angle between the absorption axis of the upper polarizing plate of the image forming device and the retardation axis of the phase difference plate is 45°±10°, and
    an absolute value of an angle between the absorption axis of the polarizing plate on the touch panel side and the absorption axis of the upper polarizing plate of the image forming device is 5° to 30°.

6. The display device with an input function according to claim 3,
    wherein a ratio R1 (450 nm)/R0 (450 nm) of the phase difference value R1 (450 nm) for the phase difference plate to the phase difference value R0 (450 nm) for the ¼ wavelength plate is 0.80 to 1.15.

7. The display device with an input function according to claim 3,
    wherein the ¼ wavelength plate or/and the phase difference plate is/are formed of a plurality of layers.

* * * * *